United States Patent
Bon Saint Come et al.

(10) Patent No.: US 10,551,529 B2
(45) Date of Patent: Feb. 4, 2020

(54) COLOURED MIRROR

(71) Applicant: SAINT-GOBAIN GLASS FRANCE, Courbevoie (FR)

(72) Inventors: Yémima Bon Saint Come, Paris (FR); Elodie Meunier, Massy (FR); Benoit Georges, Abu Dhabi (AE); Virginie Moreau, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 597 days.

(21) Appl. No.: 15/312,933

(22) PCT Filed: May 21, 2015

(86) PCT No.: PCT/FR2015/051338
§ 371 (c)(1),
(2) Date: Nov. 21, 2016

(87) PCT Pub. No.: WO2015/177474
PCT Pub. Date: Nov. 26, 2015

(65) Prior Publication Data
US 2017/0192141 A1    Jul. 6, 2017

(30) Foreign Application Priority Data
May 21, 2014    (FR) ..................... 14 54574

(51) Int. Cl.
*G02B 5/08*    (2006.01)
*A47G 1/00*    (2006.01)

(52) U.S. Cl.
CPC ......... *G02B 5/0833* (2013.01); *G02B 5/0816* (2013.01); *A47G 1/00* (2013.01)

(58) Field of Classification Search
CPC .. G02B 5/0808; G02B 5/0816; G02B 5/0833; G02B 5/0858; G02B 5/204;
(Continued)

(56) References Cited

U.S. PATENT DOCUMENTS 2,411,955 A    12/1946    Colbert et al.
3,445,216 A    5/1969    Keefer et al.
(Continued)

FOREIGN PATENT DOCUMENTS

EP    1 752 501 A2    2/2007
FR    2 981 461 A1    4/2013
(Continued)

OTHER PUBLICATIONS

International Search Report as issued in International Patent Application No. PCT/FR2015/051338, dated Sep. 2, 2015.
(Continued)

*Primary Examiner* — Ricky D Shafer
(74) *Attorney, Agent, or Firm* — Pillsbury Winthrop Shaw Pittman LLP

(57) ABSTRACT

A colored mirror includes a transparent substrate, a reflective metal layer and at least one interface layer between the substrate and the metal layer, wherein the interface layer includes at least one discontinuous metal layer, and at least one overlayer of a dielectric material deposited on the discontinuous layer. The discontinuous metal layer allows the adaptation of the color reflected by the mirror. The nominal thickness thereof and the type of material, as well as the nature and thickness of the dielectric overlayer, play a role in obtaining the color of the mirror.

22 Claims, 2 Drawing Sheets

(58) Field of Classification Search
CPC ............. C03C 17/007; C03C 17/3639; C03C 17/3644; C03C 17/3663
USPC .................................................. 359/838, 883
See application file for complete search history.

(56) References Cited

U.S. PATENT DOCUMENTS

| | | | | |
|---|---|---|---|---|
| 4,009,933 | A * | 3/1977 | Firester | G02B 5/1809 359/485.03 |
| 4,772,080 | A * | 9/1988 | Tustison | C23C 28/00 204/192.26 |
| 5,128,194 | A * | 7/1992 | Sorko-Ram | A47G 1/02 428/172 |
| 9,535,198 | B2 * | 1/2017 | Faure | B29D 11/00596 |
| 2012/0081650 | A1 * | 4/2012 | Wang | G02B 5/0808 349/153 |
| 2013/0189491 | A1 * | 7/2013 | Lai | G02B 1/10 428/172 |
| 2016/0291219 | A1 * | 10/2016 | Lee | G02B 5/0858 |

FOREIGN PATENT DOCUMENTS

| | | |
|---|---|---|
| GB | 652858 | 5/1951 |
| WO | WO 2004/078664 | 9/2004 |
| WO | WO 2011/099968 A1 | 8/2011 |
| WO | WO 2013/054045 | 4/2013 |

OTHER PUBLICATIONS

Yang, Y., et al., "Plasmonic degradation and the importance of over-coating metal nanoparticles for a plasmonic solar cell," Solar Energy Materials & Solar Cells, vol. 122, Dec. 2013, XP028817627, pp. 208-216.

Leitner, A., et al., "Optical properties of a metal island film close to a smooth metal surface," Applied Optics, Optical Society of America, vol. 32, No. 1, Jan. 1993, XP002574134, pp. 102-110.

Friz, M., et al., "Coating Materials," Umicore Technical Library, Jun. 2003, XP055114783, Retrieved from the Internet: URL: http://www.thinfilmproducts.umicore.com/Library/LibraryArchive/show_article_coating_materials_12june03.pdf>. Retrieved on Apr. 22, 2014, pp. 105-130.

* cited by examiner

COLOURED MIRROR

CROSS-REFERENCE TO RELATED APPLICATIONS

This application is the U.S. National Stage of International Application Serial No. PCT/FR2015/051338, filed May 21, 2015, which in turn claims priority to French Application No. 1454574, filed May 21, 2014. The contents of all of these applications are incorporated herein by reference in their entirety.

The invention relates to a colored mirror and also to the process for manufacturing same.

For the purposes of the invention, a colored mirror is a mirror which absorbs certain wavelengths in order to impose on the mirror a reflection color which is not neutral but which has a reflection color with specific dominance.

The process of the invention makes it possible to adjust the color of the image produced in reflection by the mirror.

As is known, a mirror comprises a transparent substrate, generally made of glass, and a reflective metal layer, most commonly made of silver, the light reflection of which is extremely high from the viewpoint of the wavelengths of the visible range, so as to provide a good image in reflection.

The invention relates to mirrors in which users wish to gaze at themselves or to visualize the reflection of an object. The application to the mirrors of the invention is therefore directed toward mirrors for decorative use or functional use from the viewpoint of a subject to be reflected. The mirrors according to the invention are preferably interior mirrors. They are in particular exposed to problems of corrosion which can exist in ambient air owing to the pollutants present in the atmosphere. It is therefore important that they have sufficient durability for the desired applications. Generally, these mirrors preferentially have a light reflectivity of at least 50% in the visible range, i.e. for wavelengths between 380 and 780 nm (measured under a D65 illuminant, with an angle of observation of 10°).

It is increasingly desirable to be able to provide mirrors of various colors, for example with a reflection color of which the tone tends toward pink in order to provide an effect of "looking well" when a person looks at themselves in the mirror.

By way of other example of functionality of a mirror of the invention for visualizing an image in reflection of a subject, mention is made of a mirror which compensates for/attenuates the color of artificial lighting. Indeed, the color of artificial lighting which lights a room where a mirror is placed influences the color in reflection that said mirror provides. Thus, it may be desirable to modify the rendition of the image in reflection by adjusting the color of the mirror which, combined with the color of the artificial lighting, will give another color rendition.

Various solutions for modifying the reflection color of a mirror are known through patent documents.

Documents U.S. Pat. No. 3,445,216 and WO 2004/078664 teach an adjustment of the color by bulk-tinting the glass constituting the support substrate of the mirror.

However, the use of colored glass poses various problems, such as, for example, higher production costs, poor availability, and an impossibility of achieving very old silverings, for instance that associated with the use of mercury (hall of mirrors at Versailles).

It is also known practice to insert one or more interface layers between the substrate of the mirror and the reflective layer.

Patent GB652858 provides a mirror that is colored through the use of a stack of various thin layers of the metal or oxide or fluoride type, between the transparent substrate of the mirror and the reflective layer.

Patent application WO 2013/054045 discloses another solution as interface layer. It is the combination of an organic or inorganic or hybrid matrix and of an organic colorant inserted into the matrix in the molecular state.

The objective of the invention is to provide yet another way of manufacturing a durable colored mirror, and of providing a mirror for which the color of the reflected image can be precisely imposed by adjusting the range of wavelengths which are capable of being absorbed by the mirror.

The term "durable" is intended to mean a mirror which resists corrosion under actual conditions of chemical stresses. The durability of mirrors is in particular evaluated by carrying out CASS (Copper Accelerated Salt Spray) tests consisting in subjecting the mirror to copper-accelerated acetic salt fog tests with the addition of copper(II) chloride, according to standard EN ISO 9227.

The invention relates to a colored mirror comprising a transparent substrate, a reflective metal layer and at least one interface layer between the substrate and the metal layer, characterized in that the interface layer comprises at least one discontinuous metal layer and at least one layer of a dielectric material deposited on the discontinuous layer and hereinafter termed overlayer.

The colored mirror according to the present invention is preferably used as an interior mirror. It advantageously has good resistance to corrosion.

The term "discontinuous metal layer" is intended to mean a layer comprising a metal coating which does not coat all (100%) the surface on which it is deposited. The degree of surface occupation of this layer is strictly less than 100%. This metal coating is in the form of islands or clusters uniformly or non-uniformly distributed over the entire surface of the substrate. These islands are separated by volumes where there is a complete absence of metallic material. They can optionally be connected to one another. When reference is made to the thickness of this discontinuous metal layer, the term used in the present invention is "nominal" thickness. It is not the thickness measured in the zones covered by the discontinuous metal layer or an average thickness, but the thickness that would be obtained if the metal layer was continuous. The discontinuous metal layer is consequently of a nominal thickness less than the minimum thickness required to have a continuous complete layer.

For the purposes of the present invention, the terms "layer based on a material" are understood to mean that the layer consists mainly of this material, i.e. that the chemical element of the material or the product of the material under consideration in its stable stoichiometric formula constitutes at least 50% by atomic percentage of the layer under consideration.

In the remainder of the text, when reference is made to a reflected image or image in reflection, this is intended to mean the image, reflected by the mirror, of an animate or inanimate subject.

The dielectric overlayer covers the discontinuous metal layer and fills the spaces separating the metal islands of said discontinuous layer such that the metal islands of the layer are not in contact with the reflective upper metal layer of the mirror.

For the purposes of the invention, the term "layer of dielectric material" is intended to mean a layer in which the material is not a metal.

The interface layer (composed of the discontinuous metal layer, of at least one dielectric overlayer and optionally of one or more underlayers) is sufficiently transparent for part of the light in the visible range to pass through it in order to reach the reflective layer, to be reflected by this reflective layer and to pass through it again in the opposite direction.

The inventors have demonstrated, surprisingly, that by providing an interface layer between the reflective metal layer of the mirror and the substrate, this interface layer comprising, on the one hand, a discontinuously distributed metal layer and, on the other hand, at least one dielectric material which separates the metal of the interface layer and that of the reflective metal layer, a change in the color of an image produced in reflection by the mirror and the obtaining of a mirror resistant to corrosion are achieved.

According to one characteristic, the nominal thickness of the discontinuous metal layer, its material, the thickness of the dielectric overlayer and its material are such that they contribute to the definition (constitution) of the reflection color of the mirror. In a nonobvious manner, the inventors have demonstrated that, not only is the discontinuous metal layer important in the reflection color of the mirror, but also the dielectric overlayer.

Thus, the interface layer modifies the absorption spectrum of the mirror. By controlling the nominal thickness of the discontinuous metal layer, its material, the thickness of the dielectric overlayer and its material, the range of wavelengths which are absorbed by the interface layer are adjusted so as to finally adjust the color in reflection of the mirror.

According to another characteristic, the interface layer comprises at least one underlayer (one or more underlayers) placed under the discontinuous metal layer. The underlayer is advantageously based on a material made of metal nitrides or oxides. According to the type of material and the thickness of the dielectric underlayer, combined with the nominal thickness and with the material of the discontinuous layer, and with the thickness and the material of the dielectric overlayer, this dielectric underlayer also contributes to the definition (constitution) of the reflection color of the mirror, since it modifies the absorption spectrum of the total interface layer.

Thus, the nominal thickness of the discontinuous metal layer, its material, the thickness of the dielectric overlayer and its material, and the thickness and the material of the dielectric underlayer, when it is present, are thus selected in an appropriate manner to define the color of the mirror.

The interface layer according to the invention may be the only layer placed between the substrate and the reflective layer. However, in order to further adjust the color in reflection, and to find the appropriate color, the mirror according to the invention may comprise several interface layers placed between the substrate and the reflective metal layer.

According to another characteristic, the discontinuous metal layer has a nominal thickness of between 0.1 and 15 nm, preferably between 0.1 and 8 nm. The discontinuous layer is a metal layer, the metal being chosen from, alone or in combination, silver, gold, copper, aluminum, nickel and palladium.

Preferably, the dielectric overlayer deposited on the discontinuous layer and/or the dielectric underlayer deposited under the discontinuous metal layer are based on oxide or nitride of metals such as Mg, Al, Si, Ti, Cr, Zn, Zr, Nb, Ni, Mo, In, Sb, Sn, Ta, W or Bi or alloys of these metals. Mention will for example be made of layers based on silicon nitride $Si_3N_4$, which is optionally super- or sub-nitride, on niobium oxide, which is optionally super- or sub-oxide, denoted $Nb_2O_x$, on titanium oxide, which is optionally super- or sub-oxide, denoted $TiO_x$, on mixed tin zinc oxide, which is optionally super- or sub-oxide $SnZnO_x$, on aluminum-doped zinc oxide denoted AZO, on indium tin oxide denoted ITO or on silicon oxide, which is optionally super- or sub-oxide denoted $SiO_x$.

Advantageously, the dielectric overlayer and/or the dielectric underlayer have a thickness of at most 200 nm, in particular of between 1 and 200 nm, preferably between 5 and 50 nm.

Preferably, in order to obtain a mirror resistant to corrosion, the dielectric underlayer is preferentially chosen from silicon nitride $Si_3N_4$, which is optionally super- or sub-nitride, niobium oxide, which is optionally super- or sub-oxide denoted $Nb_2O_x$, titanium oxide, which is optionally super- or sub-oxide denoted $TiO_x$, mixed tin zinc oxide, which is optionally super- or sub-oxide $SnZnO_x$, indium tin oxide denoted ITO or silicon oxide, which is optionally super- or sub-oxide denoted $SiO_x$.

The dielectric overlayer is for its part chosen from niobium oxide, which is optionally super- or sub-oxide denoted $Nb_2O_x$, or titanium oxide, which is optionally super- or sub-oxide denoted $TiO_x$. Even more preferentially, the dielectric overlayer is made of titanium oxide, which is optionally super- or sub-oxide denoted $TiO_x$.

The transparent substrate can be a sheet of inorganic or organic glass, the thickness of which ranges between 2 and 8 mm. If the glass is organic, it may be of polycarbonate, of poly(methyl methacrylate), of polyethylene terephthalate or of poly(ethylene-co-tetrafluoroethylene). The substrate may also be a plastic film.

The reflective metal layer enabling the mirror function may be made of silver or of aluminum. It may be deposited in the vapor phase, for example by CVD, PVD, magnetron, evaporation or by the liquid route depending on the type of material. It generally has a thickness of between 20 nm and 200 nm, preferably between 50 and 150 nm.

In one preferred example of the invention, the colored mirror is such that the substrate is made of glass, preferably of thickness between 2 and 4 mm, the reflective metal layer is made of silver, preferably of thickness between 50 and 100 nm, the discontinuous metal layer is made of silver, preferably of nominal thickness between 0.1 and 1.5 nm, and the dielectric overlayer has a thickness of between 1 and 10 nm, and is preferably $Si_3N_4$, ITO, $SnZnO_x$, $Nb_2O_x$ or $TiO_x$. Such a mirror produces a color in reflection which is pink or tends toward pink, giving in particular an effect of "looking well" when a person looks at themselves in the mirror.

In another more preferred example, the colored mirror is such that the substrate is made of glass, preferably of thickness between 2 and 4 mm, the reflective metal layer is made of silver, preferably of thickness between 50 and 100 nm, the discontinuous metal layer is made of silver, preferably of nominal thickness between 0.1 and 1.5 nm, and the dielectric overlayer has a thickness of between 1 and 10 nm, and is made of $Nb_2O_x$ or $TiO_x$.

In another even more preferred example, the colored mirror is such that the substrate is made of glass, preferably of thickness between 2 and 4 mm, the reflective metal layer is made of silver, preferably of thickness between 50 and 100 nm, the discontinuous metal layer is made of silver, preferably of nominal thickness between 0.1 and 1.5 nm, and the dielectric overlayer has a thickness of between 1 and 10 nm, and is $TiO_x$. Such a mirror has the desired coloration and very good resistance to corrosion.

According to yet another characteristic, a primer layer can be deposited on the interface layer and constitutes a functional layer for facilitating the adhesion of the reflective metal layer of the mirror. This primer layer is for example made of titanium or of nickel-chromium NiCr alloy, which are optionally super- or sub-oxides ($TiO_x$ or $NiCrO_x$) when the reflective metal layer is deposited in the vapor phase.

When the depositing of the reflective metal layer is carried out by the liquid route, conventionally in silver-plating processes, primer layers based on tin and palladium chloride are deposited on the interface layer, and constitute functional layers for facilitating the adhesion of the reflective metal layer of the mirror.

Advantageously, it proved to be the case that the primer layer causes little or no variation of the reflection color rendered via the interface layer.

A protective functional layer can be placed on the reflective metal layer of the mirror, and is based on oxide or nitride of metals such as Mg, Al, Si, Ti, Cr, Zn, Zr, Nb, Ni, Mo, In, Sb, Sn, Ta, W or Bi or alloys of these metals. Mention will for example be made of $Si_3N_4$, $Nb_2O_x$, $TiO_x$, $SnZnO_x$ or $SiO_x$. Preferentially, this protective functional layer is present when the continuous reflective layer was deposited by magnetron.

Usually, a protective coating of the paint type is preferably deposited on the reflective metal layer, or even on its optional protective layer. This coating is generally of the alkyd, polyurethane or acrylic type.

The invention also relates to a process for manufacturing a colored mirror, comprising a step of depositing at least one interface layer on a substrate, a step of depositing a reflective metal layer on the coated substrate, and optionally the depositing of a protective layer on the reflective metal layer, characterized in that the depositing of the interface layer comprises a step of depositing a discontinuous metal layer on the substrate, a step of depositing at least one overlayer on the discontinuous layer forming a dielectric layer between the discontinuous metal layer and the reflective metal layer, the overlayer preferably being a metal oxide or nitride, and optionally a step of depositing one or more dielectric underlayers, preferably of metal oxide or nitride, arranged on the substrate and prior to the depositing of the discontinuous metal layer.

This process differs from the conventional processes for preparing silver mirrors in that it does not comprise a step of brightening the surface on which the reflective metal layer is deposited. For conventional mirrors, this step is usually carried out on the glass substrate before the sensitizing and activating steps which precede the depositing of the layer of silver, with the aim of improving their durability.

According to one characteristic, the step of depositing the interface layer consists, depending on the desired color in reflection of the mirror, in selecting the material, and adjusting the nominal thickness of the discontinuous metal layer, and in selecting and adjusting the material and the thickness of the dielectric overlayer, and also in selecting and adjusting the material and the thickness of the dielectric underlayer when it is present.

The depositing of the discontinuous metal layer is preferably carried out by magnetron sputtering. In order to vary the nominal thickness of said discontinuous layer, the power applied to the target is varied, while the substrate is fixed under the target for the same depositing time, or else the run speed of the substrate under the target is varied while keeping the power fixed. It is also possible to vary the power while maintaining the same run speed of the substrate under the target.

The value of the nominal thickness for a given power is therefore accessible by considering the run speed of the substrate in the layer depositing chamber and the amount of material sputtered per unit of time at this power. The power/run speed couple makes it possible in particular to adjust the nominal thickness of the discontinuous layer. By way of example, if usually, under given magnetron sputtering deposition conditions (very low pressure, target composition, electrical power applied to the cathode), the thickness of the layer is 10 nm, the run speed of the substrate will be increased by a factor of 2 in order to obtain half the layer thickness, i.e. 5 nm.

The depositing of the dielectric overlayer or of the dielectric underlayer which is based on metal oxide or nitride is preferably carried out via magnetron sputtering.

Furthermore, the inventors have shown, in a nonobvious manner, that by adjusting the oxygen content during the magnetron sputtering deposition of the dielectric overlayer and/or the dielectric underlayer of the interface layer, when said layers are based on a metal oxide and are in direct contact with the discontinuous metal layer, this results in an adjustment of the color shade of the mirror.

The depositing of the reflective metal layer is carried out in a known manner by vapor phase (CVD, PVD, magnetron, evaporation) or liquid process. Preferably, the depositing of the reflective metal layer is carried out by liquid process.

When the substrate is made of glass, it is possible for the latter to have undergone a tempering treatment or texturing before the depositing of the interface layer.

Finally, the invention relates to the use of a transparent substrate comprising a reflective metal layer for the mirror function, and at least one interface layer between the substrate and the metal layer in order to provide a colored mirror, characterized in that the interface layer comprises at least one discontinuous metal layer, and at least one overlayer of a dielectric material deposited on the discontinuous layer, and optionally at least one underlayer of a dielectric material deposited under the discontinuous layer, and in that the color of the mirror is chosen by selecting the nature and the nominal thickness of the discontinuous layer and the nature and the thicknesses of the dielectric overlayer(s) and underlayer(s).

By way of examples, that are in no way limiting, of functionality of such a mirror for visualizing an image in reflection, mention is made of a mirror for which a color suitable for the image in reflection is desired, such as a pink color giving the person looking at themselves in the mirror an effect of "looking well", or else a mirror which compensates for/attenuates the color of artificial lighting.

The present invention is now described by means of examples that are solely illustrative and in no way limiting with respect to the scope of the invention, and on the basis of the illustrations attached hereto, in which:

FIGS. 1 and 2 are not to scale in order to facilitate reading thereof.

Figures 1A, 1B:
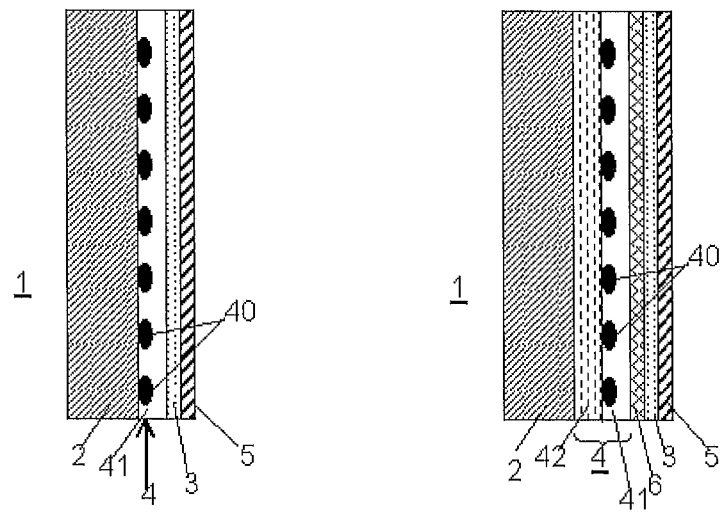
FIG. 1a represents a diagrammatic sectional view of a mirror according to the invention.
FIG. 1b represents a variant of FIG. 1.

The colored mirror 1 of the invention comprises a transparent substrate 2 such as a glass substrate, a reflective metal layer 3 such as made of silver, an interface layer 4 described hereinafter and placed between the substrate 2 and the reflective metal layer 3, and a layer of paint 5 such as acrylic covering the reflective metal layer 3.

Figure 2:
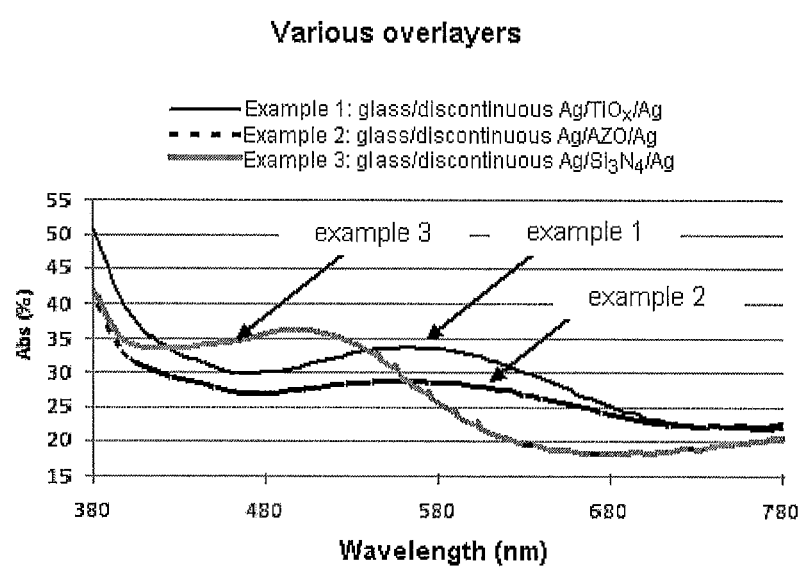
FIG. 2 shows the absorption of visible light as a function of the wavelength for several samples, illustrating the role played by the nature of the material of the dielectric overlayer from the viewpoint of the color in reflection of the mirror.

In the variant of FIG. 2, the colored mirror comprises a primer layer 6 deposited on the interface layer 4 in order to facilitate the adhesion of the reflective silver layer 3. This primer layer is, for example, made of NiCr.

According to the invention, the interface layer 4 comprises at least one discontinuous metal layer 40 and at least one overlayer 41 composed of a dielectric material, covering the discontinuous metal layer so as to prevent any contact between the discontinuous layer 40 and the reflective metal layer 3.

In the variant of FIG. 2, the interface layer 4 comprises an additional layer 42 which is a dielectric underlayer deposited under the discontinuous metal layer 41.

The role of the interface layer 4 is to modify the absorption spectrum in the visible range of the mirror so as to produce an image in reflection of which the color is modified, i.e. different than the color produced in the absence of such an interface layer.

The dielectric overlayer 41 and the dielectric underlayer 42 have a role with regard to the optical properties and also make it possible to protect the discontinuous metal layer.

The inventors have demonstrated, surprisingly, that:
   an interface layer, which is transparent in order for the light to reach the reflective layer 3, makes it possible to modify the absorption spectrum in the visible range and thus the color of the image in reflection in the mirror;
   the discontinuous metal layer 40 of the interface layer participates in the modification of the color of the mirror;
   the dielectric overlayer 41 required for isolating the reflective metal layer 3 from the discontinuous metal layer 40 also makes it possible to adjust the color of the image in reflection;
   the dielectric underlayer 42 also makes it possible, if required, to further adjust the color,
   the mirrors according to the invention have an improved durability.

The material and the nominal thickness of the discontinuous metal layer 40, and the nature and thickness of the dielectric overlayer 41 and of the dielectric underlayer 42 are adjusted according to the desired color in reflection.

The mirror of the invention can comprise several stacks of interface layers, each interface layer comprising one or more dielectric underlayers, a discontinuous metal layer and one or more dielectric overlayers, for adjusting the desired color and shade.

The curves described hereinafter from the viewpoint of FIG. 3 et seq. show how it is possible, by adjusting the types of material and the thicknesses, to modify the wavelengths absorbed and the amount of light absorbed in order to provide a suitable color in reflection.

The discontinuous metal layer 40 is composed solely of metal preferably chosen from the following metals, alone or in combination: silver, gold, copper, aluminum, nickel and palladium. It has a nominal thickness not exceeding 15 nm in order to remain discontinuous, i.e. without it being able to entirely cover (100%) the surface on which it is deposited.

The dielectric overlayer 41 is composed of a metal oxide or nitride, preferably chosen from $Si_3N_4$, $Nb_2O_x$, $TiO_x$, $SnZnO_x$, AZO, ITO and $SiO_x$. More preferentially, it is chosen from $Si_3N_4$, $Nb_2O_x$, $TiO_x$, $SnZnO_x$, ITO and $SiO_x$. Even more preferentially, the dielectric overlayer 41 is made of $TiO_x$.

Figure 3:
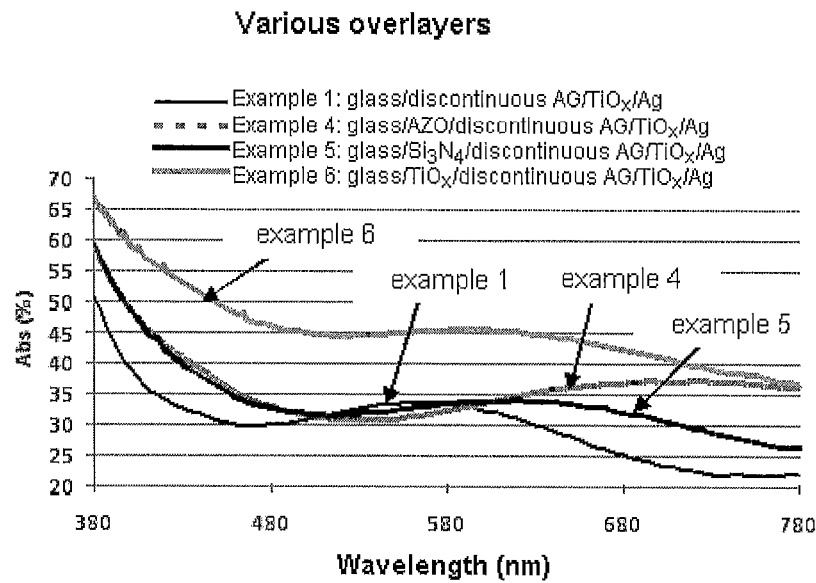
FIG. 3 shows the absorption of visible light as a function of the wavelength for several samples, illustrating the role played by the nature of the material of the dielectric underlayer from the viewpoint of the color in reflection of the mirror.
Figure 4:
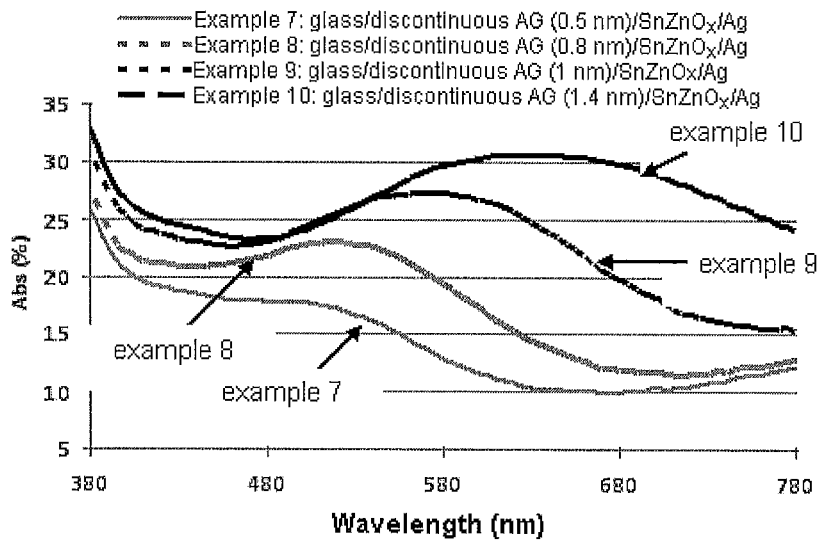
FIG. 4 shows the absorption of light as a function of the wavelength for several samples, illustrating the role played by the nominal thickness of the material of the discontinuous layer from the viewpoint of the color in reflection of the mirror.

Comparative tests by way of examples that are in no way limiting were carried out by varying the nature of the overlayer (FIG. 2), the nature of the dielectric underlayer (FIG. 3) and the nominal thickness of the discontinuous metal layer (FIG. 4). The table hereinafter summarizes, for each example, the nature and the thickness of the dielectric underlayers and overlayers and also the nominal thickness of the discontinuous silver layer constituting the interface layer, the thickness of the reflective silver layer of the mirror and the thickness of the substrate.

| Examples | Underlayer (nature and thickness) | Thickness of the discontinuous Ag layer | Overlayer (nature and thickness) | Thickness of the reflective Ag layer | Thickness of the glass substrate |
|---|---|---|---|---|---|
| Example 1 | — | 1 nm | $TiO_x$: 5 nm | 70 nm | 4 mm |
| Example 2 | — | 1 nm | AZO: 5 nm | 70 nm | 4 mm |
| Example 3 | — | 1 nm | $Si_3N_4$: 5 nm | 70 nm | 4 mm |
| Example 4 | AZO: 5 nm | 1 nm | $TiO_x$: 5 nm | 70 nm | 4 mm |
| Example 5 | $Si_3N_4$: 5 nm | 1 nm | $TiO_x$: 5 nm | 70 nm | 4 mm |
| Example 6 | $TiO_x$: 5 nm | 1 nm | $TiO_x$: 5 nm | 70 nm | 4 mm |
| Example 7 | — | 0.5 nm | $SnZnO_x$: 5 nm | 100 nm | 2 mm |
| Example 8 | — | 0.8 nm | $SnZnO_x$: 5 nm | 100 nm | 2 mm |
| Example 9 | — | 1 nm | $SnZnO_x$: 5 nm | 100 nm | 2 mm |
| Example 10 | — | 1.4 nm | $SnZnO_x$: 5 nm | 100 nm | 2 mm |

In all of examples 1 to 10:
the substrate is made of glass, sold under the name Planilux by the company Saint-Gobain Glass France;
the reflective metal layer 3 is made of silver deposited by magnetron sputtering;
no protective coating was added to the reflective layer 3;
the discontinuous metal layer 40 is made of silver and deposited by the magnetron sputtering technique;
the underlayers and overlayers were deposited by magnetron sputtering.

The conditions for the magnetron depositing of the various layers of the interface layer are given below:

| Layer | Target used | Depositing pressure (in $10^{-3}$ mbar) | Depositing power (in W) | Gas | Amount of gas (in cm$^3$/min or sccm) |
|---|---|---|---|---|---|
| Discontinuous Ag layer of 0.5 nm | Ag | 8 | 50 | Ar | 150 |
| Discontinuous Ag layer of 0.8 nm | Ag | 8 | 70 | Ar | 150 |
| Discontinuous Ag layer of 1 nm | Ag | 8 | 100 | Ar | 150 |
| Discontinuous Ag layer of 1.4 nm | Ag | 8 | 150 | Ar | 150 |
| TiOx | TiO$_2$ | 2 | 2000 | Ar | 40 |
| AZO | ZnO: Al 2% by weight | 2 | 1300 | Ar | 40 |
| Si$_3$N$_4$ overlayer | Si: Al 8% by weight | 1.5 | 2300 | Ar + N$_2$ | 19 (Ar) 23 (N$_2$) |
| SnZnO$_x$ | SnZnO at 50:50% by weight | 2 | 1000 | Ar + O$_2$ | 40 (Ar) 5 (O$_2$) |

FIGS. 2 to 4 make it possible to demonstrate the influence of the nature of the materials and thicknesses and/or nominal thicknesses of each of the layers of the interface layer from the viewpoint of the wavelengths absorbed in order to modify the color of an image in reflection by the mirror.

FIG. 2 shows the role played by the nature of the material of the dielectric overlayer 41 in the color in reflection of the mirror. This involves examples 1 to 3 of the table.

For these absorption curves of examples 1 to 3 of mirrors, only the dielectric overlayer 41 of the interface layer 4 differs, the mirror comprising the glass, the discontinuous silver layer 40 of nominal thickness 1 nm (without dielectric underlayer), the dielectric overlayer 41 and the reflective silver layer 3 of 70 nm. The various dielectric overlayers are respectively TiO$_x$ (example 1), AZO (example 2) and Si$_3$N$_4$ (example 3), each having a thickness of 5 nm.

It is noted that the absorption spectrum is different for each of the examples, producing a different color of the image in reflection by the mirror.

Measurements in the L*a*b* system were carried out in order to characterize the color of the mirror of each example. All the measurements in the various tables which follow were carried out under a D65 illuminant and with an angle of observation of 10°.

| Example | L* | a* | b* |
|---|---|---|---|
| Example 1 (TiO$_x$) | 85.9 | 0.6 | −0.9 |

-continued

| Example | L* | a* | b* |
|---|---|---|---|
| Example 2 (AZO) | 87.9 | 0.3 | −0.1 |
| Example 3 (Si$_3$N$_4$) | 87.1 | 6.7 | 3.9 |

This confirms that each example indeed corresponds to a particular color. Examples 1 and 2 are nevertheless very similar and describe mirrors having a relatively neutral color. On the other hand, example 3 with Si$_3$N$_4$ results in a distinct color, the color possibly being described as "peach".

FIG. 3 shows that the addition of a dielectric underlayer 42 also plays a role in the color in reflection of the mirror.

FIG. 3 illustrates four curves for four mirrors comprising the reflective silver layer 3 of 70 nm, and the interface layer 4 which comprises a discontinuous silver layer 40 of 1 nm, a TiO$_x$ dielectric overlayer 41 of 5 nm and, according to the respective examples, no underlayer (example 1 of FIG. 2), an AZO underlayer having a thickness of 5 nm (example 4), an Si$_3$N$_4$ underlayer having a thickness of 5 nm (example 5) and a TiO$_x$ underlayer having a thickness of 5 nm (example 6).

It is noted that, when a dielectric underlayer is added (examples 4, 5 and 6) with regard to example 1 without dielectric underlayer, the colors vary, the curves of FIG. 3 being shifted and the absorption values being different.

The following measurements were also carried out:

| Example | L* | a* | b* |
|---|---|---|---|
| Example 1 (without underlayer) | 85.9 | 0.6 | −0.9 |
| Example 4 (AZO underlayer) | 85.9 | −3.9 | 4.4 |
| Example 5 (Si$_3$N$_4$ underlayer) | 85.6 | −2.7 | 3.2 |
| Example 6 (TiO$_x$ underlayer) | 78.9 | −2.3 | 4.8 |

When there is no dielectric underlayer (example 1), the color is neutral as already seen.

However, it is noted that, when a dielectric underlayer is added, the color totally changes, the L*a*b* values all being different. From the neutral color of example 1, the color goes to a color that tends toward yellow for examples 4, 5 and 6. The yellow will be shaded according to the nature of the material of the dielectric underlayer.

FIG. 4 shows the role played by the nominal thickness of the discontinuous metal layer 40. This figure illustrates four examples for which the interface layer has no dielectric underlayer and has an SnZnO$_x$ overlayer having a thickness of 5 nm, and a discontinuous Ag layer of which the nominal thickness varies, with respectively 0.5 nm (example 7), 0.8 nm (example 8), 1 nm (example 9) and 1.4 nm (example 10).

It is noted here again that each absorption curve exhibits an absorption peak which is shifted in terms of wavelength, and a distinct amount of absorption, finally changing the reflection color of the mirror.

The colors in the L*a*b* system are the following:

| Example | L* | a* | b* |
|---|---|---|---|
| Example 7 (Ag of 0.5 nm) | 93.9 | 2.2 | 2.5 |
| Example 8 (Ag of 0.8 nm) | 91.4 | 3.5 | 0.5 |
| Example 9 (Ag of 1 nm) | 88.9 | 0.7 | −2.4 |
| Example 10 (Ag of 1.4 nm) | 88.2 | −2.0 | −2.9 |

It is noted that the nominal thickness of the discontinuous metal layer plays an unquestionable role in the color of the mirror.

Example 7 gives rather a peach color. Example 8 tends toward red, while example 9 is rather blue and example 10 is green-blue in color.

Thus, by increasing the nominal thickness of the discontinuous Ag layer, the color, or even the shade, is modified.

Consequently, the invention very advantageously makes it possible to manufacture a mirror on which the color can be imposed. The interface layer with its discontinuous metal layer unquestionably makes it possible to provide a specific color. The desired color of the mirror (including the color shade) will be provided by adjusting not only the nature and the nominal thickness of the discontinuous layer, but also by appropriately selecting the nature and the thickness of the dielectric overlayer, and of the dielectric underlayer, and combining them with, if required, several stacks of interface layers of chosen material natures and thicknesses.

Corrosion resistance tests were carried out on certain mirrors according to the present invention.

A first series of tests was carried out in order to compare the durability of the mirrors after several cycles of CASS test.

A "conventional" mirror was thus compared with a mirror according to the invention during 4 consecutive cycles. The "conventional" mirror comprises a glass substrate of 4 mm of Planiclear type, on which a silver reflective metal layer of 70 nm has been liquid-deposited and which has then been covered with a layer of paint having a thickness of approximately 50 µm.

The mirror according to the invention (example 11) comprises a glass substrate of Planiclear type of 4 mm on which are deposited a discontinuous silver layer having a nominal thickness of 0.5 nm and a $TiO_x$ overlayer having a thickness of 5 nm, deposited by magnetron, then a liquid-deposited silver reflective metal layer of 70 nm, and a protective paint layer having a thickness of approximately 50 µm. The silver-plating and depositing of the protective paint layer were carried out in the same way for both the mirrors tested.

The mirrors thus obtained are subjected to four cycles of CASS test (120 h at 50° C., aqueous solution of 50 g/l of NaCl and 0.26 g/l of anhydrous $CuCl_2$, the pH being between 3.1 and 3.3) and the width of corrosion on the edges of the mirrors is measured.

The table below gives the values of the corrosion widths in microns measured on the edges for each of the two mirrors:

|  | Comparative "conventional" mirror (series 1) | Mirror according to the invention example 11 |
| --- | --- | --- |
| Cycle 1 | 287 µm | 100 µm |
| Cycle 2 | 537 µm | 137 µm |
| Cycle 3 | 837 µm | 225 µm |
| Cycle 4 | 862 µm | 362 µm |

The mirror according to the invention exhibits better durability than the conventional mirror tested, although no step of brightening the surface on which the reflective silver layer is deposited was carried out.

A second series of tests (series 2) was carried out on various mirrors according to the invention, by performing one cycle of CASS test. The results obtained were compared with a reference mirror, not in accordance with the invention, prepared under the same conditions as the mirrors according to the invention with regard to the depositing of the silver reflective metal layer and the protective paint layer.

Example 12: a glass substrate of 4 mm of Planiclear type is covered with a $TiO_x$ underlayer having a thickness of 5 nm, with a discontinuous silver layer having a nominal thickness of 0.5 nm and then with a $TiO_x$ overlayer having a thickness of 5 nm, all of these layers being deposited by magnetron. A silver reflective metal layer having a thickness of 70 nm is then liquid-deposited and is covered with a protective paint layer of 50 µm.

Example 13: a glass substrate of 4 mm of Planiclear type is covered with an $SiO_x$ underlayer having a thickness of 5 nm, with a discontinuous silver layer having a nominal thickness of 0.5 nm and then with a $TiO_x$ overlayer having a thickness of 5 nm, all of these layers being deposited by magnetron. A silver reflective metal layer having a thickness of 70 nm is then liquid-deposited and is covered with a protective paint layer of 50 µm.

The comparative reference mirror (series 2) is a Planiclear-type glass substrate on which a silver reflective metal layer having a thickness of 70 nm has been liquid-deposited and which has then been covered with a protective paint layer of 50 µm.

The table below gives the values of the corrosion widths in microns measured on the edges for each of the 3 mirrors after one cycle of CASS test.

|  | Corrosion width at the edges (µm) |
| --- | --- |
| Example 12 | 181 |
| Example 13 | 175 |
| Comparative mirror, series 2 | 562 |

These examples show that the mirrors according to the invention have an improved durability compared with the reference mirror although no step of brightening the surface on which the reflective silver layer is deposited was carried out.

The invention claimed is:

1. A colored mirror comprising a transparent substrate, a reflective metal layer and at least one interface layer between the substrate and the metal layer, wherein the interface layer comprises at least one discontinuous metal layer and at least one overlayer of a dielectric material deposited on the discontinuous metal layer, wherein the substrate is made of glass, the reflective metal layer is made of silver, the discontinuous metal layer is made of silver, and the dielectric overlayer has a thickness of between 1 and 10 nm, and is made of ITO, $SnZnO_x$, $Nb_2O_x$ or $TiO_x$.

2. The mirror as claimed in claim 1, wherein the interface layer comprises at least one dielectric underlayer placed under the discontinuous metal layer and wherein the underlayer is based on a material made of metal nitrides or oxides.

3. The mirror as claimed in claim 2, wherein the dielectric underlayer deposited under the discontinuous metal layer is based on oxide or nitride of metals selected from Mg, Al, Si, Ti, Cr, Zn, Zr, Nb, Ni, Mo, In, Sb, Sn, Ta, W or Bi or alloys of these metals.

4. The mirror as claimed in claim 3, wherein the dielectric underlayer deposited under the discontinuous metal layer is based on silicon nitride $Si_3N_4$, which is optionally super- or sub-nitride, or on niobium oxide, which is optionally super- or sub-oxide, denoted $Nb_2O_x$, or on titanium oxide, which is optionally super- or sub-oxide, denoted TiO$_x$, or on mixed tin zinc oxide, which is optionally super- or sub-oxide SnZnO$_x$, or on aluminum-doped zinc oxide denoted AZO, or on indium tin oxide denoted ITO or on silicon oxide, which is optionally super- or sub-oxide denoted SiO$_x$.

5. The mirror as claimed in claim 2, wherein the dielectric underlayer deposited under the discontinuous metal layer has a thickness of between 1 and 200 nm.

6. The mirror as claimed in claim 5, wherein the dielectric underlayer deposited under the discontinuous metal layer have a thickness of between 5 and 50 nm.

7. The mirror as claimed in claim 2, wherein the dielectric underlayer is chosen from silicon nitride Si$_3$N$_4$, which is optionally super- or sub-nitride, niobium oxide, which is optionally super- or sub-oxide denoted Nb$_2$O$_x$, titanium oxide, which is optionally super- or sub-oxide denoted TiO$_x$, mixed tin zinc oxide, which is optionally super- or sub-oxide SnZnO$_x$, indium tin oxide denoted ITO, and silicon oxide, which is optionally super- or sub-oxide denoted SiO$_x$.

8. The mirror as claimed in claim 1, wherein a nominal thickness of the discontinuous metal layer, its material, a thickness of the dielectric overlayer and its material, are such that they define a reflection color of the mirror.

9. The mirror as claimed in claim 8, wherein the nominal thickness of the discontinuous metal layer, its material, the thickness of the dielectric overlayer and its material, and a thickness and a material of the dielectric underlayer are such that they define the reflection color of the mirror.

10. The mirror as claimed in claim 1, wherein the discontinuous metal layer has a nominal thickness of between 0.1 and 15 nm.

11. The mirror as claimed in claim 10, wherein the discontinuous metal layer has a nominal thickness of between 0.1 and 8 nm.

12. The mirror as claimed in claim 1, further comprising a primer layer deposited on the interface layer in order to facilitate the adhesion of the reflective metal layer of the mirror.

13. The mirror as claimed in claim 1, wherein the dielectric overlayer is made of Nb$_2$O$_x$ or TiO$_x$.

14. The mirror as claimed in claim 1, wherein the substrate has a thickness between 2 and 4 mm, the reflective metal layer has a thickness between 50 and 100 nm, and the discontinuous metal layer has a nominal thickness between 0.1 and 1.5 nm.

15. A process for manufacturing a colored mirror, comprising:
depositing at least one interface layer on a substrate; and
depositing a reflective metal layer on the substrate coated with the at least one interface layer, wherein the depositing of the interface layer comprises depositing a discontinuous metal layer on the substrate, depositing an overlayer on the discontinuous metal layer forming a dielectric layer between the discontinuous metal layer and the reflective metal layer,
wherein the substrate is made of glass, the reflective metal layer is made of silver, the discontinuous metal layer is made of silver, and the dielectric overlayer has a thickness of between 1 and 10 nm, and is made of ITO, SnZnO$_x$, Nb$_2$O$_x$ or TiO$_x$.

16. The process as claimed in claim 15, further comprising depositing one or more dielectric underlayers arranged on the substrate and prior to the depositing of the discontinuous metal layer.

17. The process as claimed in claim 16, wherein depositing the interface layer comprises, depending on a desired color in reflection of the mirror, selecting a material and adjusting a nominal thickness of the discontinuous metal layer, selecting and adjusting a material and a thickness of the dielectric overlayer, and selecting and adjusting a material and a thickness of the one or more dielectric underlayers.

18. The process as claimed in claim 16, wherein the one or more dielectric underlayers of the interface layer is/are deposited by magnetron sputtering and wherein, for the one or more dielectric underlayers which are in direct contact with the discontinuous metal layer and are based on a metal oxide, an oxygen content is adjusted during the depositing thereof in order to modify the color in reflection of the mirror.

19. The process as claimed in claim 15, wherein the one or more underlayers is/are made of metal oxide or nitride.

20. The process as claimed in claim 15, further comprising depositing a protective layer on the reflective metal layer.

21. A method comprising utilizing a transparent substrate comprising a reflective metal layer for a mirror function, and at least one interface layer between the substrate and the reflective metal layer in order to provide a colored mirror, wherein the interface layer comprises at least one discontinuous metal layer, and at least one overlayer of a dielectric material deposited on the discontinuous metal layer, and wherein a color of the mirror is chosen by selecting a material and a nominal thickness of the discontinuous layer and a material and a thickness of the at least one dielectric overlayer, wherein the substrate is made of glass, the reflective metal layer is made of silver, the discontinuous metal layer is made of silver, and the dielectric overlayer has a thickness of between 1 and 10 nm, and is made of ITO, SnZnO$_x$, Nb$_2$O$_x$ or TiO$_x$.

22. The method as claimed in claim 21, wherein at least one dielectric underlayer is deposited under the discontinuous metal layer.

* * * * *